United States Patent Office 3,017,876
Patented Jan. 23, 1962

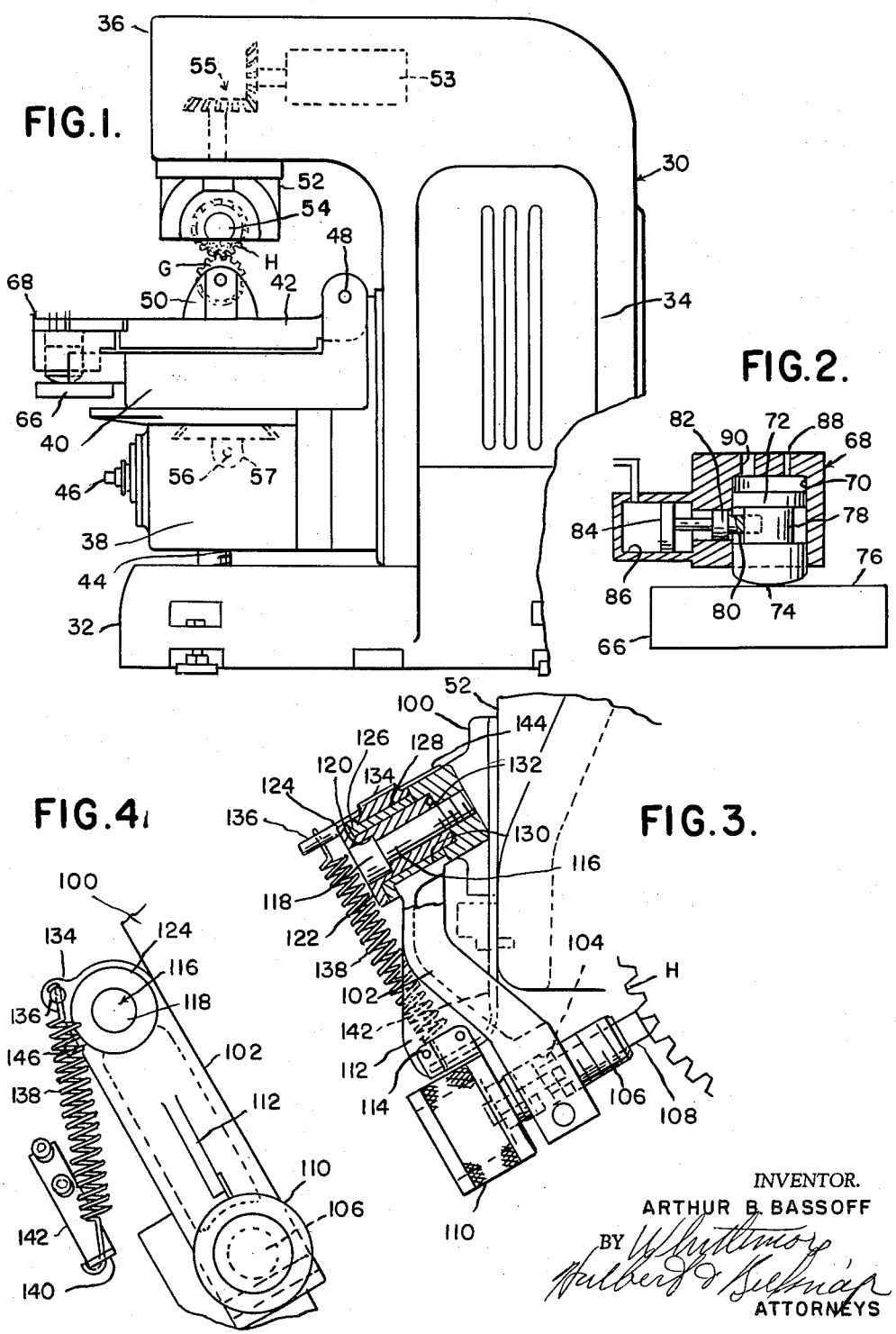

3,017,876
TOOL TRIMMER
Arthur B. Bassoff, Detroit, Mich., assignor to National Broach & Machine Company, Detroit, Mich., a corporation of Michigan
Filed Mar. 23, 1959, Ser. No. 801,093
10 Claims. (Cl. 125—11)

The present invention relates to a tool trimmer, and more particularly, to a tool for use in trimming the outside diameter of a gear-like honing tool.

It is an object of the present invention to provide a manually operated trimming tool in conjunction with a gear honing machine operable to periodically reduce the outside diameter of a resinous gear hone as the gear hone is worn or consumed in use.

More specifically, it is an object of the present invention to provide a swingable support operable to swing a trimming element across the periphery of a gear-like gear honing tool to reduce the outside diameter thereof.

It is a further object of the present invention to provide a tool trimmer comprising a swingable arm, and a trimming element adjustable in a direction parallel to the axis of the swingable arm.

It is a further object of the present invention to provide a tool trimmer comprising a swingable arm, a trimming element carried by the free end of said arm, means for adjusting said trimming element in a direction parallel to the axis about which said arm swings, and resilient means connected to said arm and effective normally to maintain said arm in a retracted inoperative position.

Other objects and features of the invention will become apparent as the description proceeds, especially when taken in conjunction with the accompanying drawings, illustrating a preferred embodiment of the invention, wherein:

FIGURE 1 is an elevational view of a gear honing machine to which the present tool trimmer is applied.

FIGURE 2 is an enlarged view, partly in section, showing the pressure applying and locking means associated with the gear honing machine.

FIGURE 3 is an enlarged fragmentary elevational view of the tool trimmer in applied position.

FIGURE 4 is a fragmentary end view of the tool trimmer.

The present invention relates generally to the trimming of gear-like gear honing tools. The operation may be carried out as a final finishing operation on a hardened steel gear and may be employed to remove nicks and minor imperfections from the teeth of the work gear, or in some cases it may be used to improve surface finish as well as profile and tooth form.

The honing tool employed for this operation is a gear-like body having peripheral teeth conjugate to the form desired on a series of work gears to be finished. At least the peripheral toothed portion of the honing tool is formed of a resin compound in which the resin constituent is preferably epoxy resin. A suitable tool for this purpose may be made by casting a resin compound into final form and curing the same by the application of heat.

By way of a specific example, a resin compound containing equal parts of an epoxy resin and a suitable filler such for example as powdered silica, may have a hardener or accelerator added thereto, a suitable hardener or accelerator being an aliphatic polyamine such as diethylene triamine, in which case about one part of the hardener to twelve parts of the epoxy resin is suitable. An epoxy resin suitable for this purpose is produced by reacting epichlorohydrin and bisphenol A in the presence of a sodium hydroxide solution in water. The reaction is carried out at a temperature of about 100 degrees centigrade. After the condensation reaction has taken place, the resin is freed of residual epichlorohydrin and is washed well to remove salt and soluble by-products. The reaction is carried out to produce a reaction product having an average molecular weight of approximately 400. The resin is a liquid. The epoxy value, equiv./100 gm. is 0.50. The hydroxyl groups per molecule are 0.14–0.28.

The honing tool as described above has a specially long life and in some cases is capable of finishing a great many thousands of gears even though the gears may in some cases have substantial nicks and burrs on their teeth. However, despite its long life, the honing tool is subjected to continuous wear or breakdown throughout its life. It has been found that by controlling the rate and manner of breakdown of the hone, the teeth of the hone may be preserved throughout the useful life of the hone in a condition to perform an efficient honing operation and at the same time to produce substantial improvement in the teeth of the gears being honed, particularly in the involute profile thereof. Moreover, by controlling the breakdown of the teeth of the hone, glazing of the teeth is prevented and breakage of the teeth due to excessive pressure developed as a result of glazing is completely eliminated.

It has been found that best results are obtained when the honing operation is carried out by rolling the hone in mesh with the work gears with the parts urged into pressure engagement by forces applied radially thereto in the direction of a line passing through the axes of the hone and work gears. This pressure may be applied continuously and substantially uniformly throughout the honing operation, or as an alternative, the hone may be urged into pressure contact with the gears at a predetermined pressure and the parts locked at the center distance determined by the radial force. Thereafter, the hone and gears are rolled by driving either the gear or hone in rotation and the other of the two members through the meshed engagement therebetween. Preferably, the operation is carried out with the axes of the gear and hone crossed and a relative traverse provided between the gears and hone in a plane parallel to the axes of both the gears and hone and preferably in a direction parallel to the axes of the gears.

It will be apparent that a tooth of the gear or hone urged by radial force into a tooth space of the other member at a given force develops forces of much greater magnitude between the flanks of the teeth due to the wedging action therebetween. The magnitude of these developed forces is dependent on a number of factors including operating pressure angle. Inasmuch as the teeth of the gear and hone are initially brought into tight mesh or are maintained through the honing operation in tight mesh, it will be apparent that in conventional honing relative approach between the gear and hone is prevented only by the wedging action between the flanks of the teeth. As the gear and hone are rotated this wedging action is variable and produces unpredictable and uncontrolled conditions which vary as a tooth moves through the zone of meshed engagement. This has led to a change in form of the hone teeth, the development of a shoulder adjacent the roots of the hone teeth, and other undesirable results.

It has now been found that if the hone is designed so that the crests of the gear teeth engage the bottoms of the tooth spaces of the hone, several important advantages are obtained. In the first place, the engagement between the crests of the teeth of the gear and the surfaces at the bottoms of the tooth spaces of the hone is the engagement which is effective for the most part to limit radial movement between the gear and hone; or in other words, to control the depthwise movement between the gear and hone. This relieves the flanks of the teeth from the cramping pressure which has in the past led to distortion of tooth profile of the hone and other undesirable results. Secondly, the engagement between the crests of the teeth of the work gears with the surfaces at the bottoms of the tooth spaces of the hone provides for a controlled breakdown of the material of the hone and this in turn leads to a controlled continuous regeneration of the honing surface. This regeneration, again due to the engagement between the crests of the teeth of the work gear and the surfaces at the bottoms of the tooth spaces of the hone, takes place over the entire tooth space of the hone including the tooth flanks at opposite sides thereof and the root surfaces at the bottoms of the tooth spaces. This continuous regeneration of the honing surface keeps the surfaces sharp and effective and prevents glazing. It also has the effect of maintaining desirable profiles on the honing surfaces so that they are effective to produce the required tooth form on the teeth of work gears.

Finally, the engagement of the crests of the teeth of the work gears with the surfaces at the bottoms of the tooth spaces of the hone has the further desirable effect of finishing the crests and corners at the tops of the gear teeth, thus removing burrs or imperfections which would be missed if the engagement between the teeth were limited to engagement between the flanks thereof.

It has been found that by designing a honing tool for initial operation with tooth flanks containing portions of the involute spaced substantially upwardly from the base circle, the regeneration may be continued for an extended period. In one specific case a hone designed for operation on a gear having 16 diametral pitch was continuously used until the root diameter was reduced by approximately four times the initial depth of the tooth spaces on the hone. In general, it appears that regeneration may be continued to a point where the base diameter approaches the operating pitch diameter.

As the regeneration of the tool is carried out the continuous deepening of the tooth spaces would ultimately result in interference between the crests of the teeth of the hone and the surfaces at the bottoms of the spaces between the teeth of the work gears. It is accordingly necessary periodically to remove some of the material from the crests of the teeth of the hone, or in other words, to reduce its outside diameter.

Referring now to FIGURES 1 and 2 there is shown a machine capable of operation in a manner to carry out the invention disclosed herein. Described in general terms, the machine comprises a frame indicated generally at 30 including a base 32, a column 34, an overhanging portion 36, a vertically movable knee 38, a carriage 40 mounted on the knee, and a pivoted support table 42. The knee 38 is vertically movable to accommodate gears of different sizes and to provide a preliminary setting of the machine. Suitable means such for example as a feed screw 44 may be provided for effecting vertical adjustment of the knee, this being accomplished by rotation of the feed screw 44 and a nut (not shown) as controlled by a handle applied to the square end of an actuating shaft 46. The carriage 40 is mounted on suitable ways provided at the top of the knee 38 and may be mounted thereon for reciprocation in a horizontal plane in a direction perpendicular to the plane of FIGURE 1. In other cases, as is well understood in the art, the direction of traverse in the horizontal plane may be varied.

Mounted on the carriage 40 is the pivoted table 42, the table being mounted for rocking movement about pivot means indicated at 48 which extend horizontally and which are located above the plane of the table so as to be somewhat closer to the horizontal plane passing through the point of contact between the gear G and tool H. Mounted on the pivoted table 42 is a rotary work support means including a headstock (not shown) and a tailstock indicated at 50. In the gear honing operation the gear G is in mesh with a honing tool H. While the axes of the gear G and honing tool H in FIGURE 1 are indicated as parallel, in practice the axes of these members will be crossed in space normally at an angle of between three and thirty degrees. The tool H is carried by an angularly adjustable head 52, the head being mounted for adjustment about a vertical axis to vary the crossed axes setting between the gear and tool. A motor 53 is provided and is connected to the spindle 54 of the tool H by gearing indicated at 55. Normally, suitable feed means such as the feed screw 56 and nut 57 are provided for effecting relative traverse between the carriage 40 and the knee 38.

The pivoted table 42 is mounted for substantially free angular movement about the axis of its pivot support 48 and limited angular movement from the position illustrated produces substantially vertical movement of the gear G. When the gear G is in firm mesh with the tool H upward torque applied to the table 42 results in radial pressure or force acting between the gear and tool along a line connecting their axes.

Referring now more particularly to FIGURE 2, means are provided for moving the pivoted table 42 upwardly in a controlled manner. The carriage 40 has rigidly secured thereto a support plate 66. Fixedly secured to the pivoted table 42 is an expansible fluid pressure operating means indicated generally at 68 which comprises a cylinder 70 open at its bottom and having a piston 72 vertically movable therein. The lower end of the piston includes a spherically rounded portion 74 engageable with the upper surface 76 of the plate 66. The intermediate portion of the piston 72 is reduced as indicated at 78 and is engaged by a friction lock 80 carried by a plunger 82 connected to a piston 84 movable horizontally in a cylinder 86.

Fluid, preferably hydraulic fluid, may be admitted under controlled pressure through the ports 88 and 90 to the cylinder 70 to apply a force on the piston 72 tending to elevate the table 42 so as to urge the gear G into mesh with a predetermined force with the hone H. The pressure of the fluid required to exert the desired force may be determined by experimentation but of course is sufficient in the first place to overcome the weight of the table 42 and then to provide a sufficient excess force balanced by the pressure contact between the gear and hone.

The honing operation may be carried out while pressure is admitted to the cylinder 70 so that the predetermined radial force between the gear and hone is maintained substantially constant throughout the honing operation. Alternatively, pressure may be applied initially to bring the gear and hone into pressure contact at the predetermined pressure, after which hydraulic fluid may be admitted to the cylinder 86 to actuate the friction lock and thus preserve the center distance between the gear and hone at the value determined by the pressure initially applied. In this latter case as material is removed from the teeth of the gear by honing there will be some reduction in pressure during the honing operation.

The regeneration of the honing surfaces of the honing tool is facilitated by the fact that ordinarily the outside diameter of a gear blank which has been machined to produce a gear is normally turned so that the crests of the teeth of the work are normally rough-turned surfaces most effective to facilitate breakdown of the material of the hone at the bottoms of the tooth spaces in a controlled manner.

As best seen in FIGURES 3 and 4, a trimmer is mounted on the adjustable head 52. The trimmer comprises a mounting bracket 100 bolted or otherwise secured to the tool head 52. Mounted for swinging movement on the bracket 100 is a trimmer arm 102 having at its free end a threaded opening 104 adapted to receive the threaded shank 106 of a trimming element 108. The element 108 is preferably a cylindrical body composed of metal bonded diamonds and as such as a standard article of commerce. The shank 106 includes a knurled head 110. The arm 102 adjacent to the knurled head 110 includes a web 112 to which is attached a gauge plate or scale 114 so that the advance of the trimming element 108 by rotation of the knurled head 110 may be measured directly.

The arm 102 is maintained on the bracket 100 by a screw 116 having a head 118 engageable with a shoulder 120 formed on a retainer bushing 122. The retainer bushing 122 has a head portion 124 engageable with a flange 126 on a bearing 128 received in an opening 130 provided at the pivoted end of the arm 102. The inner end of the retainer bushing 122 extends into a seat 132 formed in the outer end of the bracket 100.

The arm 102 has an ear 134 extending outwardly therefrom which receives a pin 136 to which one end of a tension spring 138 is connected. The other end of the spring is connected to the outwardly bent end portion 140 of a bracket 142 fixed to the tool head 52. The pin 136 extends completely through the ear 134 and has an inner portion 144 which is adapted to engage a second pin or abutment 146 carried by the bracket 100. The tension spring is effective to rotate the arm 102 until such rotation is terminated by engagement between the pins 136 and 146, at which time the trimmer is in an inoperative position in which it does not interfere with operation of the gear honing machine, nor if desired, with automatic loading of the machine by appropriate mechanism.

When trimming of the gear-like tool becomes desirable it is only necessary for the operator to rotate the head 110 to advance the diamond stick 108 a predetermined amount as measured by the graduated scale 114. Thereafter, the operator swings the arm about the axis of the screw 116 causing the diamond stick to swing in an arc transversely from side to side of the gear-like honing tool. In FIGURE 3 a portion of the honing tool H is indicated and it will be observed that as the tool is rotated by its motor and the trimmer operated as above described, the tips or crests of the teeth 150 will be reduced by an amount dependent upon the advance given to the trimming element 108.

It will further be observed that upon each advance of the trimming element 108, unless it is rotated exactly 360 degrees, a new surface portion thereof will be presented for engagement by the crests of the teeth of the hone H. This has the desirable result of increasing life of the diamond stick.

As best seen in FIGURE 3, it will be noted that the diameter of the cylindrical diamond stick is greater than the space between crests of adjacent teeth so that the stick or trimming element cannot enter into the space between adjacent teeth. Accordingly, its trimming action is brought about by frictional engagement between the top surfaces of the hone teeth and the end surface of the cylindrical diamond stick. This of course tends to produce a cylindrically concave end surface on the stick the radius of curvature of which is equal to the outside radius of the honing tool. However, since endwise adjustment of the diamond stick is accompanied by rotation thereof, each adjustment destroys the registration between the cylindrical end surface on the diamond stick and the cylindrical envelope of the honing tool. Thus, at each adjustment the end of the diamond stick is itself dressed by the crests of the teeth of the hone so as to provide a fresh surface which is most effective for removing material from the crests of the hone teeth.

The drawings and the foregoing specification constitute a description of the improved trimming tool in such full, clear, concise and exact terms as to enable any person skilled in the art to practice the invention, the scope of which is indicated by the appended claims.

What I claim as my invention is:

1. Trimming mechanism for a rotary gear-like honing tool having circumferentially spaced tooth portions formed of a resin compound including abrasive particles, comprising means mounting a gear-like hone for rotation about its axis, a trimmer having a cylindrical trimming element having its end engageable with the crests of the teeth of said hone during rotation of said hone, and means mounting said trimming element for movement in a plane parallel to the hone axis and in a direction traversing the hone from side to side.

2. Trimming mechanism for a rotary gear-like honing tool having circumferentially spaced tooth portions formed of a resin compound including abrasive particles, comprising means mounting a gear-like hone for rotation about its axis, a swingable carriage mounted on a pivot and movable across an edge of the hone generally parallel to its axis, a cylindrical trimming element on said carriage and having an axis parallel to the axis of the aforesaid pivot, and means for adjusting said element endwise on said carriage toward and away from the hone to bring its end surface into engagement with the crests of the hone teeth.

3. Trimming mechanism for a rotary gear-like honing tool having circumferentially spaced tooth portions formed of a resin compound including abrasive particles, comprising means mounting a gear-like hone for rotation about its axis, a swingable carriage mounted on a pivot and movable across an edge of the hone generally parallel to its axis, a cylindrical trimming element on said carriage and having an axis parallel to the axis of the aforesaid pivot, and threaded means for adjusting said element endwise on said carriage toward and away from the hone in a direction radial thereof while effecting rotational adjustment thereof.

4. Trimming mechanism for a rotary gear-like honing tool having circumferentially spaced tooth portions formed of a resin compound including abrasive particles, comprising means mounting a gear-like hone for rotation about its axis, a carriage mounted on a pivot and movable across an edge of the hone generally parallel to its axis, a cylindrical trimming element on said carriage, and threaded means for adjusting said element endwise on said carriage parallel to the axis of said pivot and generally radially of said hone while effecting rotational adjustment thereof, said element having a diameter greater than the space between crests of adjacent teeth to prevent entry of the end of said element into the spaces between adjacent hone teeth.

5. Trimming mechanism for a rotary gear-like honing tool having circumferentially spaced tooth portions formed of a resin compound including abrasive particles, comprising means mounting a gear-like hone for rotation about its axis, a pivoted arm mounted on a pivot and having a free end swingable across an edge of the hone generally parallel to its axis, a cylindrical trimming element on the free end of said arm and having an axis parallel to the axis of the aforesaid pivot, and means for adjusting said element endwise on said arm toward and away from the hone.

6. A gear honing machine comprising a rotary support for a gear-like hone formed of a resinous abrasive material, means for driving the support in rotation, a housing shaped to cover a portion of a hone on said support and to expose a peripheral portion thereof for selective engagement with a series of gear-like tools in successive meshing engagement therewith and with a trimmer, said trimmer comprising a movable member mounted on a pivot on said housing, said member being movable across an edge of the hone generally parallel to its axis, said member having a cylindrical trimming element thereon and having its end movable across and in contact with the edge of the exposed peripheral portions of a hone on said support to reduce the outside diameter of the hone, said trimming element being adjustable in a direction parallel to the axis of the aforesaid pivot.

7. A gear honing machine comprising a rotary support for a gear-like hone formed of a resinous abrasive material, means for driving the support in rotation, a housing shaped to cover a portion of a hone on said support and to expose a peripheral portion thereof for selective engagement with a series of gear-like tools in successive meshing engagement therewith and with a trimmer, said trimmer comprising a movable member mounted on a pivot on said housing, said member being movable across an edge of the hone generally parallel to its axis, said member having a cylindrical trimming element thereon movable across the edge of the exposed peripheral portions of a hone on said support generally parallel to the axis of the hone to reduce the outside diameter of the hone, said trimming element being adjustable in a direction parallel to the axis of the aforesaid pivot, and resilient means connected between said member and said housing to urge said member to a clearance position in which it is separated from the exposed peripheral portion of the hone to permit meshing of work gears therewith.

8. A gear honing machine comprising a rotary support for a gear-like hone formed of a resinous abrasive material, means for driving the support in rotation, a housing shaped to cover a portion of a hone on said support and to expose a peripheral portion thereof for selective engagement with a series of gear-like tools in successive meshing engagement therewith and with a trimmer, said trimmer comprising a pivotally movable member mounted on said housing and having a cylindrical trimming element mounted on the free end thereof and having its end surface movable across the edge of the exposed peripheral portion of a hone on said support generally parallel to the axis of the hone to reduce the outside diameter of the hone, and resilient means connected between said housing and pivoted member to urge said member into a clearance position in which it exposes the peripheral portions of a hone in said housing for meshed engagement with a succession of work gears, said trimming element being adjustable in a direction parallel to the pivot axis of said movable member.

9. A gear honing machine comprising a rotary support for a gear-like hone formed of a resinous abrasive material, means for driving the support in rotation, a housing shaped to cover a portion of a hone on said support and to expose a peripheral portion thereof for selective engagement with a series of gear-like tools in successive meshing engagement therewith and with a trimmer, said trimmer comprising a pivotally movable member mounted on a pivot on said housing and having a cylindrical trimming element mounted on the free end thereof movable across the edge of the exposed peripheral portion of a hone on said support generally parallel to the axis of the hone to reduce the outside diameter of the hone, means for adjusting said trimming element endwise parallel to the axis of said pivot and generally radially of a hone on said rotary support, said element having a diameter greater than the space between crests of adjacent hone teeth to prevent entry of the element into the spaces between adjacent hone teeth.

10. Trimming mechanism for a rotary gear-like honing tool having circumferentially spaced tooth portions formed of a resin compound including abrasive particles, comprising support means for mounting a gear-like hone for rotation about its axis, a pivot on said support means having a pivot axis perpendicular to the axis of said hone, a swingable carriage mounted on said pivot and movable across an edge of the hone generally parallel to its axis, a cylindrical trimmer element mounted on the free end of said carriage, threaded means for adjusting said trimming element endwise on said carriage parallel to the axis of said pivot and generally radially of said hone while effecting rotational adjustment thereof, said element having a diameter greater than the space between crests of adjacent hone teeth to prevent entry of the end of said element into the spaces between adjacent hone teeth, and resilient means connected between said carriage and said support means which is effective normally to maintain said carriage in a retracted inoperaitve position.

References Cited in the file of this patent

UNITED STATES PATENTS

| | | |
|---|---|---|
| 2,165,386 | Klomp | July 11, 1939 |
| 2,277,644 | Howe | Mar. 24, 1942 |
| 2,337,183 | Canning | Dec. 21, 1943 |
| 2,425,095 | Henkel | Aug. 5, 1947 |
| 2,624,159 | Balsiger | Jan. 6, 1953 |
| 2,627,141 | Praeg | Feb. 3, 1953 |
| 2,723,497 | Grobey | Nov. 15, 1955 |